(12) United States Patent
Laine et al.

(10) Patent No.: US 6,380,541 B1
(45) Date of Patent: Apr. 30, 2002

(54) DEVICE FOR LOCATING RADIATION SOURCES

(75) Inventors: Frédéric Laine, Maurepas; Olivier Gal, Paris; Séverine Gaucher, Le Val St Germain, all of (FR)

(73) Assignees: Commissariat a l'Energie Atomique, Paris; Compagnie Generale des Matieres Nucleaires, Velizy Villacoublay, both of (FR)

(*) Notice: Subject to any disclaimer, the term of this patent is extended or adjusted under 35 U.S.C. 154(b) by 0 days.

(21) Appl. No.: 09/319,889
(22) PCT Filed: Oct. 14, 1998
(86) PCT No.: PCT/FR98/02211
 § 371 Date: Jun. 14, 1999
 § 102(e) Date: Jun. 14, 1999
(87) PCT Pub. No.: WO99/19747
 PCT Pub. Date: Apr. 22, 1999

(30) Foreign Application Priority Data

Oct. 15, 1997 (FR) .............................................. 97 12892

(51) Int. Cl.$^7$ ................................................. G01T 1/20
(52) U.S. Cl. ..................... 250/368; 250/363.01; 378/63
(58) Field of Search ....................... 250/363.01, 363.02, 250/368; 378/63

(56) References Cited

U.S. PATENT DOCUMENTS

| | | | | | |
|---|---|---|---|---|---|
| 3,107,276 A | * | 10/1963 | Cohen | ......................... | 348/162 |
| 4,090,080 A | * | 5/1978 | Tosswill | ...................... | 250/578 |
| 4,105,318 A | * | 8/1978 | Yevick | ........................ | 353/120 |
| 4,528,453 A | * | 7/1985 | Heller | ...................... | 250/505.1 |
| 5,327,291 A | * | 7/1994 | Baker et al. | ................. | 359/716 |
| 5,689,376 A | * | 11/1997 | Lewis | ......................... | 359/717 |

* cited by examiner

*Primary Examiner*—Seungsook Ham
*Assistant Examiner*—Shun Lee
(74) *Attorney, Agent, or Firm*—Anderson Kill & Olick; Eugene Lieberstein; Michael Meller

(57) ABSTRACT

This device comprises a chamber (4) with a pinhole, the walls of the chamber acting as shielding (6) that absorbs radiation. The chamber contains means of forming images of the sources, due to radiation, and the area in which the sources are located, due to visible light from this area. A part (36) of the shielding in which the pinhole (32) is located, is free to move and is fixed to an optical system (34) capable of providing sharp images in visible light over the required field depth by replacing the pinhole for the formation of the image of the area, and vice versa for formation of the image of the sources. Application to localizing gamma radiation sources.

9 Claims, 2 Drawing Sheets

DEVICE FOR LOCATING RADIATION SOURCES

TECHNICAL DOMAIN

This invention relates to a device for localizing radiation sources.

It is particularly applicable to locating radiation sources that may be contained in a room, for example such as a high activity cell, or which may accidentally be present in a room.

STATE OF PRIOR ART

A device for localizing radiation sources has previously been described in the following document which should be referred to:

(1) French patent application No. 8500088, Jan. 4 1985 (see also EP-A-0 188 973 and U.S. Pat. No. 4,797,701).

The device described in the application mentioned above localizes radiation sources by using a pinhole chamber in which a film sensitive to radiation and a film sensitive to visible light are placed in the area in which sources of radiation are likely to be located, together with a shutter that opens to take a photograph in visible light and which is transparent to radiation from sources.

The radiation sources can be localized in their environment after these films have been developed and superposed (but not in real time).

An improvement to the device described in document (1) is known by the following document which should be referred to:

(2) French patent application No. 8913281, Oct. 11, 1989 (see also EP-A-0425333 and U.S. Pat. No. 5,204,533).

A particular embodiment of the device described in this document (2) is shown diagrammatically in FIG. 1.

This device is designed to determine the location of radiation sources 2 in real time, and particulary gamma radiation sources (for example X or beta radiation).

It comprises a pinhole chamber 4 formed in a body 6 that shields chamber 4 from gamma radiation.

The shielding thus absorbs radiation from sources 2 and parasite radiation from other sources that may be outside the field.

The body 6 may be made of an appropriate material such as a tungsten based alloy known under the name "Denal".

Means 8 symbolize a rotatable support of body 6 and therefore of the device.

The body 6 comprises a collimator 10 facing the chamber 4.

The wall of the collimator 10 consists of two coaxial cones with the same vertex angle, opposite each other through their common summits in which a hole is drilled to form the pinhole 12.

This collimator 10 may comprise a part 14 opaque to visible light originating from the examined area but permeable to gamma radiation, around the pinhole 12, to deal with the case in which the activity of the gamma radiation sources that are to be localized (pinhole with double diaphragm) is insufficient.

Furthermore, the collimator 10 may be interchangeable, so that a single or double diaphragm collimator can be chosen with a vertex angle appropriate to the presumed activity of the gamma sources 2 to be located.

Furthermore, changing the collimator 10 can increase or reduce the object field covered by the device, depending on the taper and focal length chosen for this collimator.

The device also comprises a mechanical shutter 16 designed to prevent visible light from the area in which the sources 2 are located, from penetrating into chamber 4, while allowing gamma radiation to pass.

This shutter 16 is a camera type iris, or for example a retractable metal plate perpendicular to the axis 18 of the chamber 4 (the axis of two cones forming the optical axis of the device) and located close to the pinhole 12 on the side of chamber 4.

Movements of the plate forming the shutter 16 are remote controlled by electromechanical means 20 themselves controlled by the remote control box 22.

This remote control box may be located at a long distance from the device if necessary.

The device also comprises a luminescent screen 24 in chamber 4 facing the pinhole 12, which is in contact with a circular shoulder inside body 6, at the same level as the bottom of the conical surface of the collimator 10.

There is a camera 26 behind screen 24 connected to real time means 28 for the acquisition, processing and displaying electrical signals output by the camera, and storage means 30.

When the shutter 16 is closed, the image of the gamma radiation sources is obtained at the end of a specific time (a few seconds, for example 10 s).

This image is stored in a first memory area of means 28.

By controlling the aperture of shutter 16, an image (in visible light) of the observed area containing the sources 2 is then obtained almost instantaneously.

This second image is also stored in the second memory area in means 28 distinct from the first memory area.

After processing of the images and particularly coloring of "spots" due to the activity of sources 2 in order to clearly identify these sources and distinguish their "gamma luminosity" from the luminosity (in visible light) of objects present in the observed area but which do not emit any gamma radiation, the first and second images are displayed superposed on the screen of means 28, so that gamma radiation sources can be identified.

Note also that the luminescent screen 24 is transparent in the visible range and is capable of converting the gamma radiation from sources 2 reaching it through the pinhole 12 into visible radiation through camera 26 that is designed to output an image of the scene that this camera observes through the pinhole 12 (when the shutter 16 is open) in the form of electrical signals.

The entry window into the camera 26 is placed in contact with screen 24, the screen being thus placed between the pinhole 12 and the camera 26.

The choice of the screen material depends on the activity of sources to be located.

If the activity is very low, an NaI screen can be used; if it is not too strong, a bismuth germanate (BGO) screen can be used, and if the activity is strong, a scintillating plastic screen can be used, for example sufficient to detect X or beta radiation.

One possible choice, which is in no way restrictive, is to use a camera 26 of the type marketed by the LHESA company which has a sensitivity of $10^{-7}$ lux and which comprises an image reducer with optical fibers 26a, on which the plane input face is in contact with the screen 24, this reducer being followed by an image intensifier 26b that is itself followed by a charge transfer matrix (CCD) marked in FIG. 1 as reference 26c.

Coupling by optical fiber image reducer 26d links matrix 26c to intensifier 26b.

An improvement to the device described in document (2) is also known in the following document, which should be referred to:

(3) French patent application No. 9403279, Mar. 21 1994 (see also EP-A-0674188 and U.S. Pat. No. 5,557,107).

This device known through document (3) comprises a collimator in front of the pinhole chamber, comprising two half-collimators free to move in rotation around a common rotation axis.

This particular collimator performs the following three functions:

- easy interchangeability with the collimator,
- the possibility of changing from the visible observation range to the gamma observation range (shutter), and
- variation of the focal length of the collimator.

In the device shown in FIG. 1, the quality of the image in visible light depends mainly on the size of the diaphragm used for formation of this image.

This size must not be too large to prevent geometric blur, and it must not be too small to prevent blur due to diffraction.

As we have already seen, an attempt is made to optimize the image quality in visible light by using a pinhole consisting of a double diaphragm, namely a small diaphragm adapted to the formation of this visible image, and a larger diaphragm adapted to the formation of an image of radiation sources (for example gamma).

However, even after optimizing the aperture in the diaphragm, the quality of images in visible light obtained with a device of the type shown in FIG. 1 is not satisfactory.

The same is true for the device described in document (1).

DESCRIPTION OF THE INVENTION

The purpose of this invention is to overcome the disadvantage mentioned above by suggesting a device for localizing radiation sources capable of identifying these sources on an image of their environment in visible light, with better quality than is possible with a device of the type shown in FIG. 1 or the type described in document (1).

More precisely, the purpose of this invention is a device for localizing radiation sources that may be located in a zone, this device comprising a pinhole chamber, the wall of which acts as shielding that absorbs the said radiation, and means of closing the pinhole chamber, these closing means being transparent to source radiation, this device also comprising means of forming images in the pinhole chamber facing this pinhole, in order to obtain firstly an image of the sources due to their radiation and secondly an image of the area due to visible light from this area when the shutter is open, this device being characterized in that some of the shielding in which the pinhole is located is free to move and is fixed to an optical system that produces sharp images in visible light on the required field depth, this optical system being capable of substituting itself for the pinhole to create an image of the area, and vice versa to form an image of the sources.

The magnification of the optical system should be exactly the same as the magnification of the pinhole forming the image of the sources.

According to one preferred embodiment of the device according to the invention, the mobile part of the shielding and the optical system are free to move in rotation about an axis parallel to the center line or the chamber.

Preferably, the shape of the moving part of the shielding is appropriate for exactly reconstituting the wall of the pinhole chamber when this pinhole is in the position in which the image of the sources can be formed.

The device may also comprise a motor reduction gear assembly fixed to the wall of the chamber, and outside the chamber, and designed to rotate the assembly formed by the mobile part of the shielding and the optical system around the axis parallel to the axis of the chamber.

Preferably, the optical system comprises:

- two lenses, designed to control focusing on the image formation means, and
- a diaphragm placed between the two lenses, the aperture of which is selected so as to obtain the required field depth.

The diameter of this aperture or pupil, which controls the aperture of the optical system, should be optimized firstly to maximize the aperture of this optical system and secondly to obtain perfect focusing of the image within the required range of field depths (for example 1 m to 10 m).

The closing means may comprise a mobile shutter transparent to radiation from sources and placed between the image formation means and the moving part of the shielding.

However, in one preferred embodiment that is easier to make, these closing means comprise an element that is opaque to visible light and transparent to radiation from sources and which permanently closes the pinhole.

The pinhole chamber closing means that are transparent to radiation from sources are preferably composed of a material chosen such that it minimizes attenuation of the sources.

For example, thin aluminum and beryllium could be used for the gamma radiation.

According to a first particular embodiment of the device according to the invention, the image formation means comprise a luminescent screen, transparent in the visible range and capable of converting radiation from the sources into visible light radiation, the shutter means also being capable of preventing visible light from the area from reaching the screen, the device also comprising a camera that is optically coupled to the screen and which is capable of supplying an image of the sources in the form of electric signals by means of light radiation that it receives from the screen, and an image of the area by means of visible light that it receives from this area through the screen when the shutter means are open.

According to a second particular embodiment, the image formation means comprise a device with two films, one of these two films being sensitive to radiation from sources and the other to visible light from the area.

BRIEF DESCRIPTION OF THE DRAWINGS

This invention will be better understood after reading a description of the following example embodiments, given for information only and in no way restrictive, with reference to the attached drawings in which.

DETAILED DESCRIPTION OF PARTICULAR EMBODIMENTS

Figure 1:
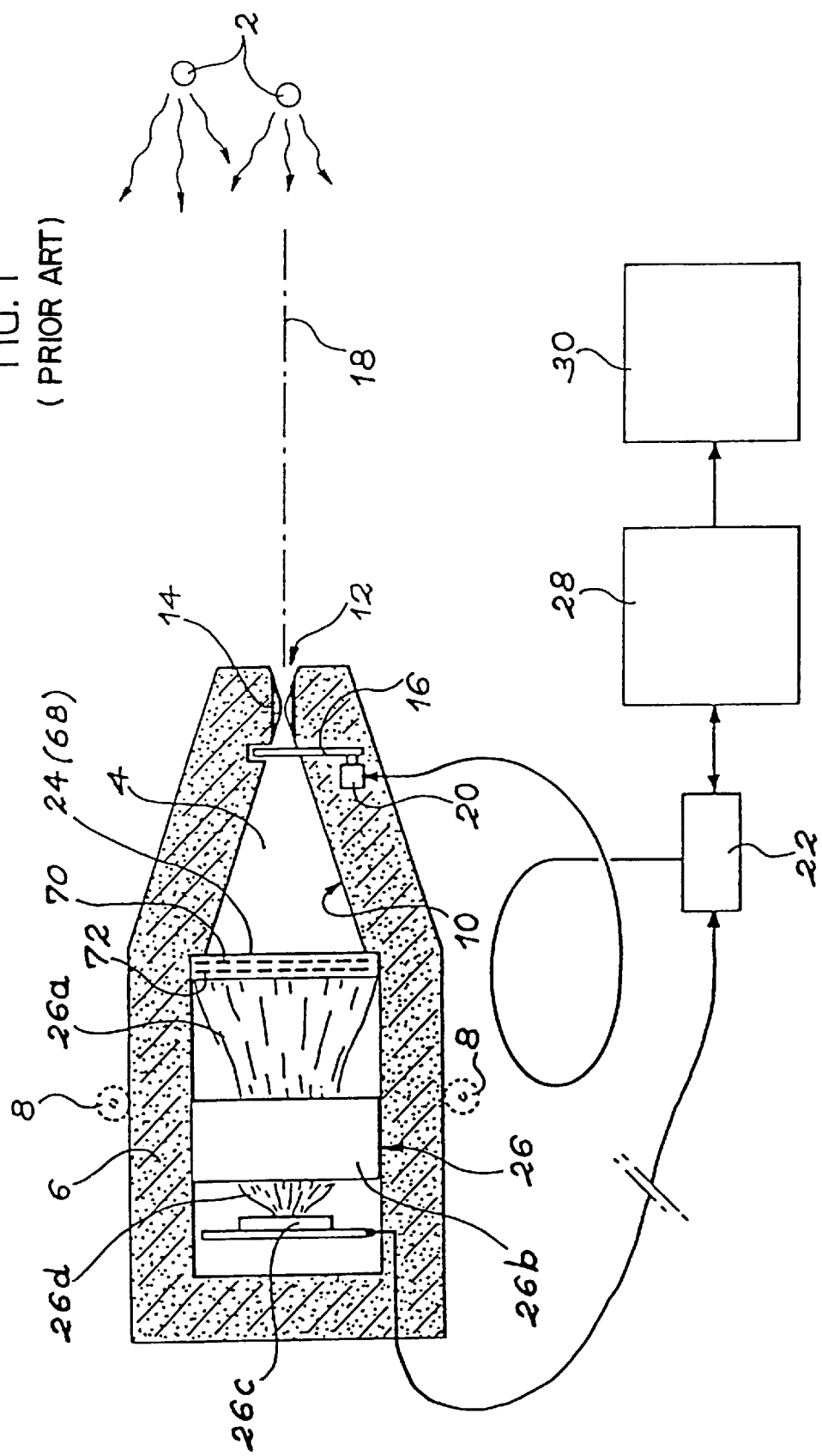
FIG. 1 is a diagrammatic cross-sectional view of a known device for localizing radiation sources and has already been described.
Figure 2:
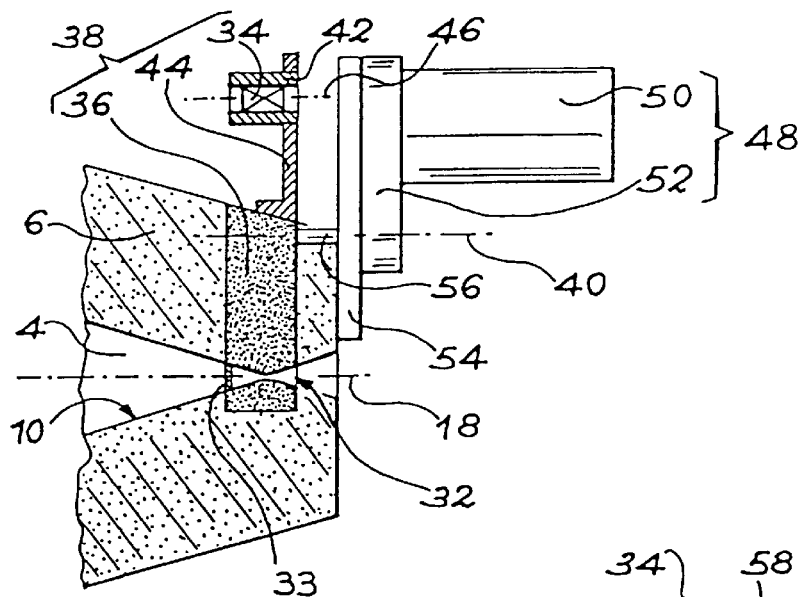
FIG. 2 is a diagrammatic and partial cross-sectional view of a particular embodiment of the device according to the invention, comprising a drum located in the position necessary to obtain an image of the sources.

The device according to the invention in FIG. 2 is identical to the device in FIG. 1 except in the front part of the device in which the pinhole is located in the case in FIG. 1.

Only the corresponding front part is shown in FIG. 2.

In the case shown in FIG. 2, the pinhole referenced 32 in this case is reserved for taking pictures of radiation sources that are to be located.

Preferably, this pinhole 32 is closed at all times by a thin sticker 33 made of a lightweight material, opaque to visible light and transparent to gamma radiation.

The pinhole 32 can also be closed off (from visible light) by means of a mobile shutter like the shutter 16 shown in FIG. 1.

This shutter is then placed between the luminescent screen (not shown in FIG. 2) and the front part of the device, which is shown in FIG. 2.

Furthermore, the device in FIG. 2 comprises an optical system 34 adapted to taking pictures of the area (in visible light) in which the sources are located.

The pinhole 32 is located in a part 36 of the shielding forming the wall of the pinhole chamber 4, and this part 36 is free to move so that it can be replaced by optical system 34 when it is required to take an image of the area in visible light.

FIG. 2 shows that the mechanical part consisting of the mobile part 36 can be used to create a perfect pinhole for taking images in gamma radiation.

This type of mobile part must be machined with the highest possible precision, which is possible as a result of improvements in computer-controlled machining.

The fact that a mobile part of the shielding is used, the shape of this part exactly matching the body 6 of the device, means that shielding around the camera can be as homogeneous as possible so that the background noise due to parasite radiation passing through the shielding is as uniform as possible.

FIG. 2 shows that the assembly formed by this mobile shielding part 36 and the optical system 32 form a sort of drum 38.

This drum 38 is free to rotate around an axis 40 on each side of which the pinhole 32 and the optical system 34 are located, and which is parallel to the optical axis 18 of the chamber 4.

The optical system 34 is mounted in a support 42 which is fixed to the shielding part 36 through an arm 44.

In the case shown in FIG. 2, the drum 38 is located in a position in which images of gamma radiation sources can be taken and the pinhole 32 is located on the center line 18 of chamber 4.

This pinhole is blocked by the sticker 33 at all times, or by the mobile shutter mentioned above in the closed position (when this type of shutter is provided).

Figure 4:
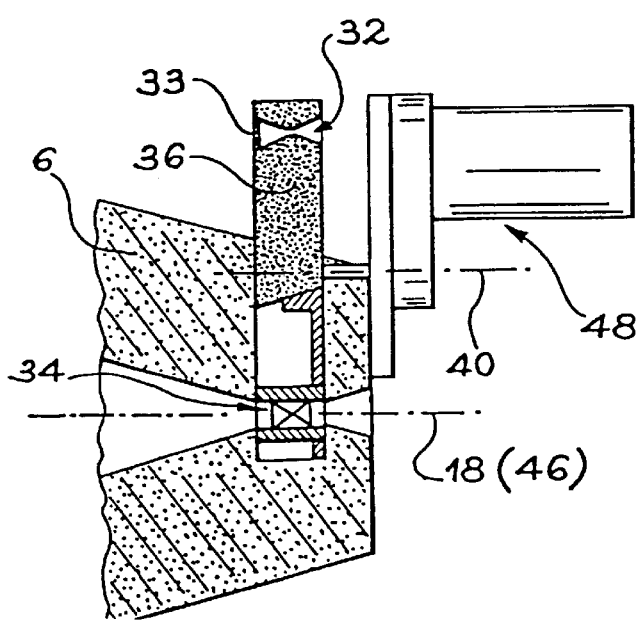
FIG. 4 is a partial diagrammatic cross-sectional view of the device in FIG. 2, the drum being located in a position which produces an image (in visible light) of the area in which the sources are located.

On the other hand in the case shown in FIG. 4, the drum 38 is located in the position in which pictures can be taken in the visible light area, and the center line 46 of the optical system coincides with the axis 18 of the chamber 4.

The mobile shutter (in the variant mentioned above) is then in the open position (possibly only during the pose time chosen by users).

The device in FIG. 2 is equipped with an assembly 48 comprising a motor 50 and a reduction gear 52 and is fixed by means of a support plate 54 to the front of the body 6 of the device.

This motor reduction gear assembly 48 is capable of rotating the drum 38 through a mechanical spindle 56 centered on the (geometric) center line 40.

Preferably, parts of the drive mechanism of the drum 38 are made of a lightweight metal, for example such as aluminum whenever possible.

Figure 3:
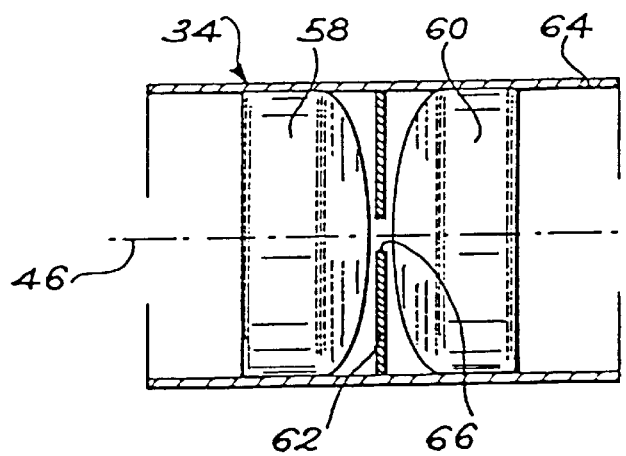
FIG. 3 is a diagrammatic cross-sectional view of the optical system forming part of the device in FIG. 2.

One preferred embodiment of the optical system 34 is shown diagrammatically in FIG. 3.

The optical system 34 in FIG. 3 comprises two lenses 58 and 60, in which the common optical axis forms the axis 46 of the optical system 34.

These two lenses form a doublet and are separated from the pupil 66 by diaphragm 62.

In the example shown, these lenses are plane/convex and their convex surfaces face each other.

These two lenses and the associated diaphragm are mounted in a support 64 that is inserted in the support 42 in FIG. 2.

Note that the optical system 34 is positioned such that its image focus is located on the entry surface of the camera 26, this entry surface being the plane common to the screen 24 and the reduction gear 26a.

By construction, the magnification is thus the same for the image in visible light and for the gamma image, and the two images can be superposed.

The two lenses are designed to enable focusing on the camera 26, or more precisely on the entry surface (defined above) of this camera, to obtain sharp images in visible light.

Furthermore, the diameter of the pupil 66 included in diaphragm 62 is optimized by a compromise between a large value of a diameter to capture a maximum amount of light and reduce diffraction effects, and a small diameter to provide a greater field depth.

In the example shown, the optical system or the objective is optimized for a field depth varying from 1 m to infinity.

This thus improves the quality of images in visible light compared with what can be obtained with the known device in FIG. 1.

This improvement in the quality of images in visible light can be quantified by means of video patterns.

The invention is not limited to use with the optical system shown in FIG. 1 and which comprises screen 24 and camera 26.

For example in another embodiment of the invention, the mobile shielding part and the optical system are used in a device with two sensitive films of the type described in document (1).

In this case, as shown very diagrammatically in FIG. 1, the screen 24 and the camera 26, and the housing 22 and means 28 and 30 are eliminated, and the two films 70 and 72 replace the screen 24 in an appropriate cassette 68.

The film 70 is only sensitive to visible light and the other film 72 is only sensitive to gamma radiation.

What is claimed is:

1. Device for localizing radiation sources contained in a given area comprising a pinhole chamber situated in said given area, a wall surrounding the pinhole chamber for shielding said pinhole chamber from radiation with said pinhole chamber having an optical axis and said wall having a pinhole and a movable section in which the pinhole is located, closing means for closing off the pinhole in the pinhole chamber, said closing means being transparent to source radiation, image forming means facing the pinhole in order to obtain firstly an image of the radiation sources due to their radiation and secondly an image of the area due to visible light from the area upon removing the closing means from the pinhole, and an optical system connected to the movable section with said movable section being adjustable for changing the relative positions of said optical system and said pinhole with respect to said pinhole chamber such that the position of the optical system and the position of the pinhole can be interchangeably switched from a first position in which the pinhole is aligned coaxially with said optical axis to a second position in which said optical system is aligned coaxially with said optical axis so that the image of the area and sources can be taken using either the pinhole or optical system, said optical system being adapted to produce sharp images in visible light over the required field depth.

2. Device according to claim 1, in which the movable section is rotatable about an axis parallel to the optical axis of the chamber.

3. Device according to claim 2, in which the movable section of the wall has the same shape independent of the position in which the movable section is rotated into.

4. Device according to claim 2, also comprising a motor reduction gear assembly fixed to said wall outside the pinhole chamber for rotating the movable section so that in the first position the pinhole is aligned with the optical axis and in the second position said optical axis is aligned with said optical system.

5. Device according to claim 1 in which the optical system comprises:

two lenses selected so as to focus on said image forming means, and a diaphragm placed between the two lenses, the aperture of which is determined to obtain the required field depth.

6. Device according to claim 1 in which the closing means comprise a movable shutter transparent to radiation from the sources and disposed in a location between the image forming means and the movable section.

7. Device according to claim 1 in which the closing means comprise an element that is opaque to visible light and is transparent to radiation from the sources.

8. Device according to claim 1 in which the image forming means comprise a luminescent screen, transparent in the visible range and capable of converting radiation from the sources into visible light radiation, the closing means also being capable of preventing visible light from the area from reaching the screen, the device also comprising a camera that is optically coupled to the screen and which is capable of supplying an image of the sources in the form of electric signals by means of light radiation that it receives from the screen, and an image of the area by means of visible light that it receives from this area through the screen when the closing means is moved from the pinhole.

9. Device according to claim 1 in which the image forming means comprise a device with two films, one of these two films being sensitive to radiation from the sources and the other to visible light from the area.

* * * * *